United States Patent [19]

Lazarus

[11] 4,178,116

[45] Dec. 11, 1979

[54] SPECTACLE FRAME WITH ANGULARLY ADJUSTABLE TEMPLES AND MEANS FOR MANUFACTURING AND ASSEMBLING SAME

[76] Inventor: Harry J. Lazarus, 36 Knox La., Englishtown, N.J. 07726

[21] Appl. No.: 795,029

[22] Filed: May 9, 1977

Related U.S. Application Data

[62] Division of Ser. No. 710,788, Aug. 2, 1976, Pat. No. 4,105,305.

[51] Int. Cl.$^2$ .................. B23B 47/28; B23B 49/02
[52] U.S. Cl. ........................ 408/108; 408/115 B; 351/111
[58] Field of Search ........... 408/115 R, 115 B, 241 B, 408/108

[56] References Cited

U.S. PATENT DOCUMENTS

| | | | |
|---|---|---|---|
| 386,739 | 7/1888 | Connelly | 408/115 |
| 3,021,734 | 2/1962 | Schlage | 408/108 |
| 3,053,121 | 9/1962 | Proctor | 408/108 |
| 3,062,076 | 11/1962 | Craig | 408/115 B |
| 3,635,571 | 1/1972 | Roberts et al. | 408/108 |
| 3,708,237 | 1/1973 | Kruse | 408/108 |

*Primary Examiner*—Leonidas Vlachos
*Attorney, Agent, or Firm*—McGlew and Tuttle

[57] ABSTRACT

The spectacle frame includes a frontal lens support incorporating a nose bridge, a pair of temples, and hinges connecting each temple to an outer end of the lens support. A blind bore is formed in either the lens support or the temple at at least one outer end of the lens support. An adjustment mechanism, including an internally threaded sleeve and an externally threaded adjusting rotor member, is inserted in each bore. The adjusting rotor member has an outer end engaging the other of the lens support and the temple. The adjusting mechanism is formed with a notched or knurled operating head particularly configured for operative association with assembling tools. For the purpose of incorporating the adjustment mechanism into already manufactured spectacle frames, each comprising a frontal lens support and a pair of temples, with the frontal lens support having two half hinges each adjacent one of its outer ends and each temple having a half hinge adjacent its inner end, a template or jig is provided cooperable with the half hinge on either the frontal lens support or a temple, or with a full hinge if the temples are already assembled on the lens support, for properly guiding a drill bit for forming the bore to receive the internally threaded sleeve. The template is provided with adjusting elements so that it may be properly positioned for forming the blind bore in either a substantially flat surface of a lens support or temple or a bevel surface thereof, and includes a guide for a drill bit which may be formed or provided with a stopper or abutment for limiting the depth of drilling.

33 Claims, 40 Drawing Figures

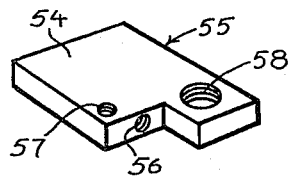
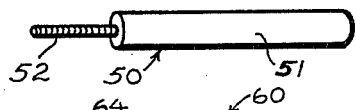
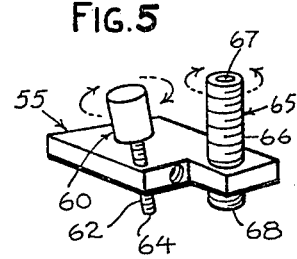
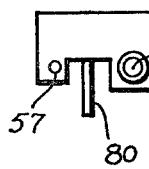
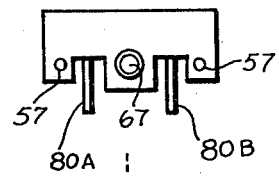
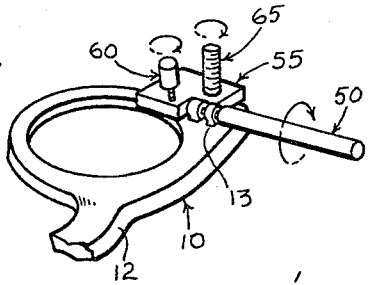
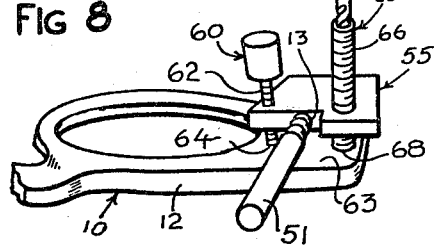
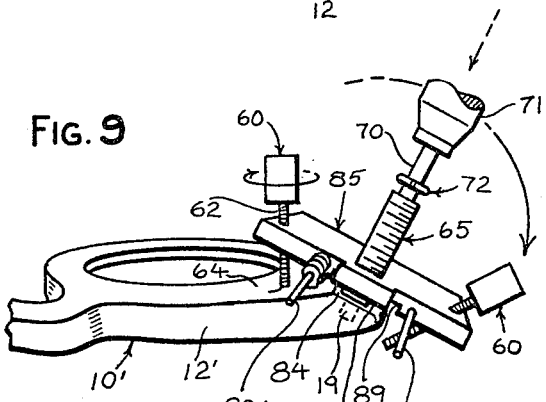
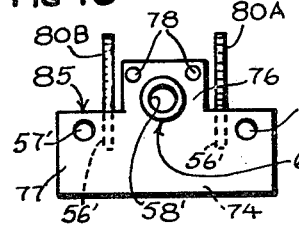
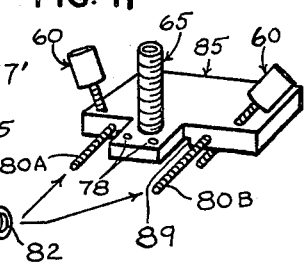
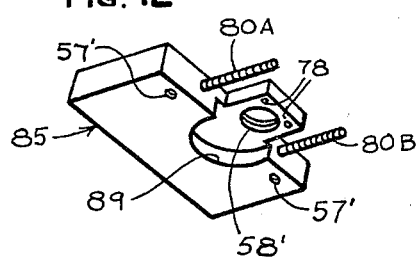
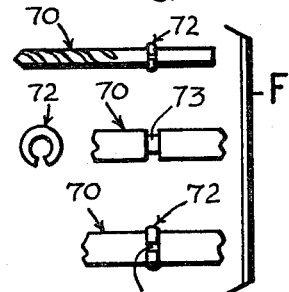
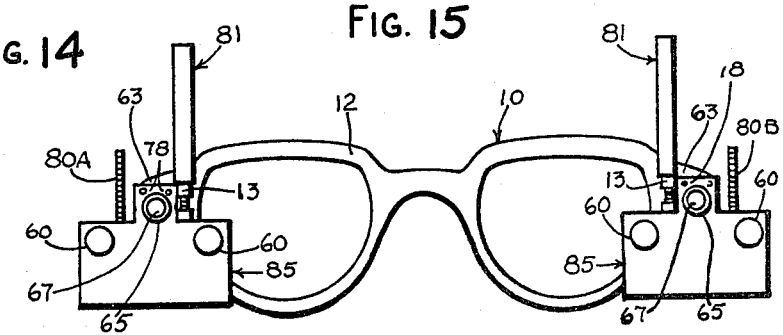

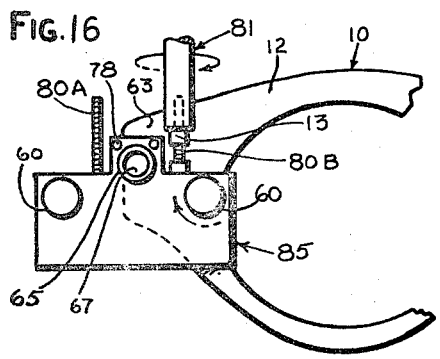
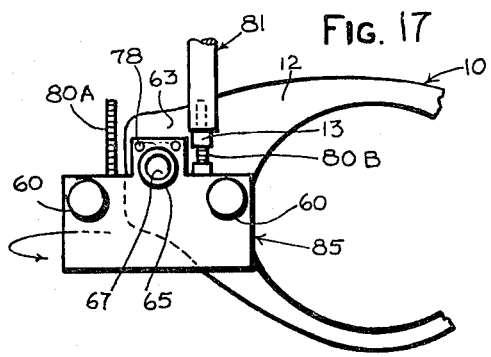
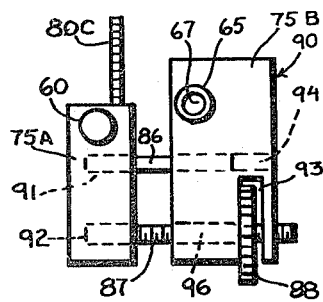
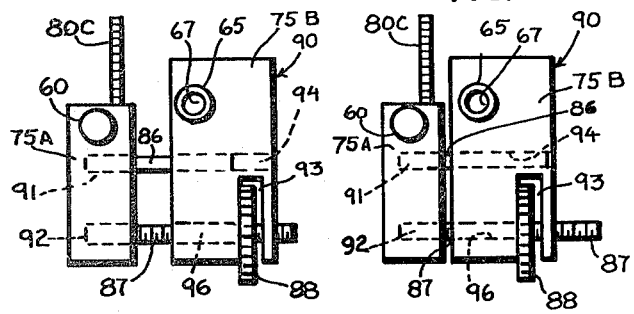
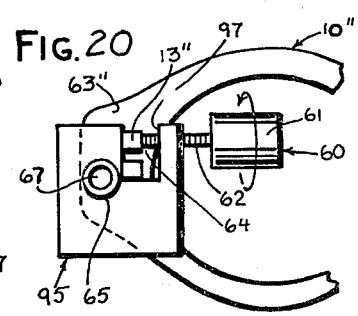
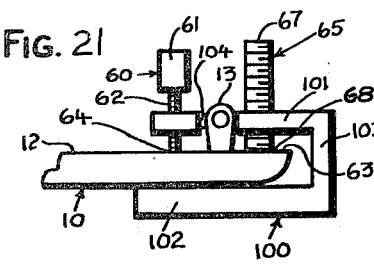
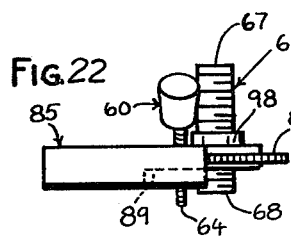
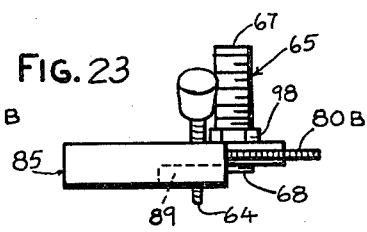
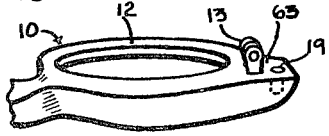
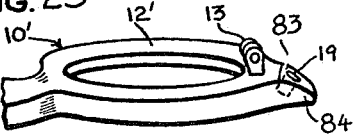
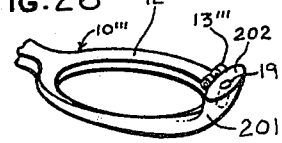
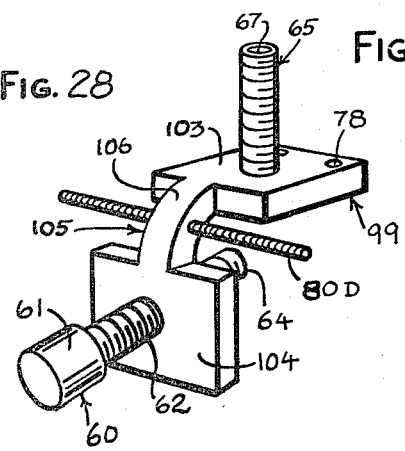
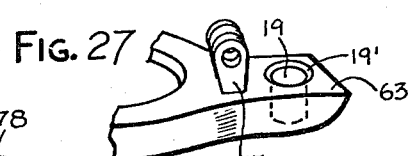
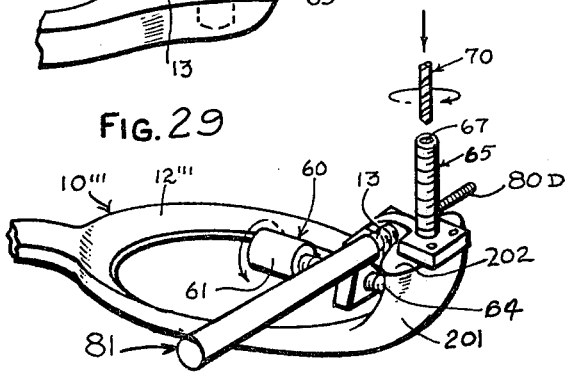

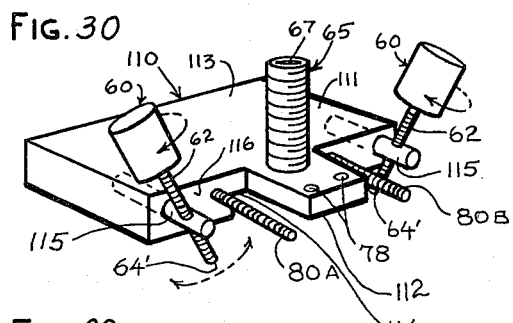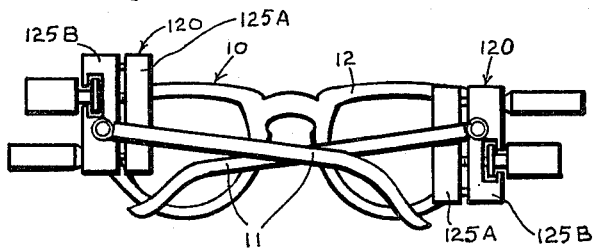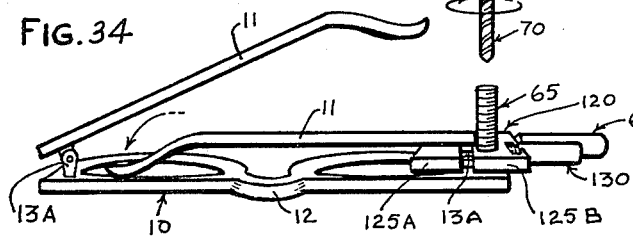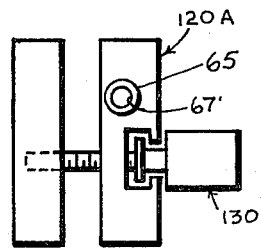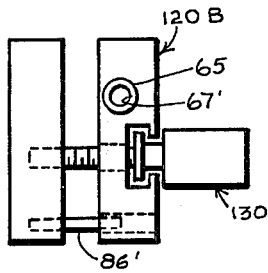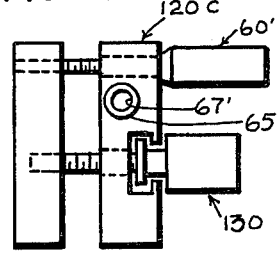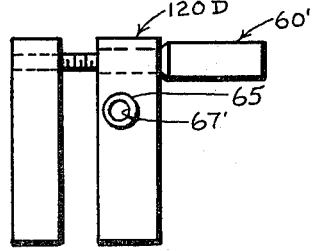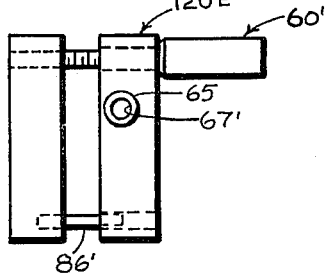

SPECTACLE FRAME WITH ANGULARLY ADJUSTABLE TEMPLES AND MEANS FOR MANUFACTURING AND ASSEMBLING SAME

This is a division of application Ser. No. 710,788 filed Aug. 2, 1976, now U.S. Pat. No. 4,105,305.

FIELD AND BACKGROUND OF THE INVENTION

In my U.S. Pat. No. 3,874,775, issued Apr. 1, 1975, there is shown, described and claimed a spectacle frame with temples which are angularly adjustable while the spectacle frame is being worn on the head of a person, or when the spectacle frame is removed from the head. For this purpose, a threaded adjusting member, such as a thumb screw or rotor having a knurled or notched operating head, is threaded either into the frontal lens support or into the inner end of a temple for adjustable positioning therein, and has an outer end engageable with the other element of the lens frame, such as the temple or the frontal lens support, so that, by fingertip rotation of the knurled or notched head, the thumb screw or rotor can be threaded in or out. The rotor is so located that it is outwardly of the hinge or pintle of a hinge connecting a temple to a frontal lens support. Thereby, by threaded adjustment of the rotor, the temple can be swung inwardly relative to the lens support to increase the pressure with which the temple bears against the head of the wearer. The adjustable pressure prevents the frames from slipping on the wearer's nose, and provides the wearer with a control of the comfort or fit of the frame while additionally providing a sufficient pressure of the temples against the head to prevent the frame from uncomfortably slipping down over the wearer's nose during wearing of the spectacle frame. Preferably, a bore is formed in the frontal lens support adjacent its outward end and outwardly of the hinge pintle, or alternatively the bore is formed in the inner end of the temple, and an internally threaded sleeve is inserted in this bore for threaded engagement with the thumb screw, rotor, or the like.

While the techniques and embodiments of the invention shown in U.S. Pat. No. 3,874,775 are easily applied during the manufacture of spectacles, as before the lens support and the temples are provided with the respective half hinges, the usefulness of the arrangement shown in the patent can be greatly extended if the adjustment means can be applied to already manufactured spectacle frames. The term "already manufactured spectacle frames", as used herein, is intended to cover a lens support, having half hinges at each end, and a pair of temples, each having a half hinge at one end, both before connection of the temples to the lens support or after the temples have been connected to the lens support to provide full hinge connections between the lens support and the two temples.

SUMMARY OF THE INVENTION

In accordance with the invention and with respect to the addition of an adjusting means to already existing new or used spectacle frames by an optician or optometrist without any special training or skills other than those already possessed, it has been found that the height and width dimensions of the hinge or barrels on the lens support and on the temples vary by only a few thousandths of an inch with different spectacle frames, and this is particularly true with respect to the hinge "rings" or "barrels". Accordingly, the invention is directed to a template which can be engaged with the rings of a half hinge or which can be clamped on the half hinge or on a full hinge for guiding a drill bit or the like in forming the mentioned bore in either the inner end of the spectacle frame temple or in the lens support adjacent the outer ends of the latter. In effect, the template provides a fool-proof means that will not damage either a non-assembled or a fully assembled spectacle frame while guiding a drill bit for the bore into which the sleeve and rotor assembly can be inserted and frictionally or otherwise held therein. The template is arranged to provide a positive guide for the direction, angulation and depth of a drilling bit for forming the bore. The template is a flat plate of a strong material, such as steel, which is formed with a preferably threaded hole therethrough for receiving a preferably externally threaded drilling tube serving as a guide for a drill bit. However, the drilling tube could be fixed into the hole as by being soldered into an unthreaded hole or fixed therein by a set screw. The preferred arrangement is a threaded bore and a threaded drilling tube, with the drilling tube locked in position by a lock nut or set screw, or by being cemented. Alternatively, the unthreaded bore itself can be used as a drilling bit guide.

The template is also formed with a second, preferably threaded, hole for receiving the preferably threaded end of an assembly shaft which has been inserted through the hinge rings of a half hinge, and thus forming a pivot for the template. A third threaded hole through the template receives a threaded stabilizer and clamping element which, when tightened, and in association with the drilling tube clamps the template adjusted to the proper "angulation" or "angular orientation" of the template, and particularly the drilling tube, relative to the particular spectacle frame element in which the bore is to be formed.

Preferably, the template is so designed that it may be inverted for drilling holes in cooperation with either a left side hinge or a right side hinge, or may be so formed that it can be used with either a left side hinge or a right side hinge without being flipped over. A preferred addition to the template is a so-called "pilot hole" which "signals" when a wrong template is being used. The templates may be provided in various dimensions for mounting on various types of frames and various types of hinges. Also, a special form of template can be provided to "clamp" a half hinge or its rings, or to clamp a full hinge of an already assembled spectacle frame, rather than being pivoted by the end of the assembly shaft engaged through the hinge rings or barrels.

An an auxiliary feature of the invention, a drill bit for forming the bore can be provided with an abutment, such as a collar or sleeve, engageable with the drilling tube to limit the depth of the bore formed by the drill bit. The drilling tube itself may be formed with suitable adjusting means, such as a threaded collar, for limiting or adjusting its position relative to the template in which it is inserted. Various other features of this form of the invention will become apparent from the following description.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is a perspective view of a template embodying the invention;

FIG. 2 is a perspective view of a template assembly tool for mounting the template of FIG. 1 on a half hinge;

FIG. 3 is a perspective view of a clamping stabilizer cooperable with the template of FIG. 1;

FIG. 4 is a perspective view of a threaded drilling tube cooperable with the template of FIG. 1;

FIG. 5 is a perspective view of the template of FIG. 1 having the clamping stabilizer and drilling tube assembled therewith to form a template assembly;

FIGS. 6A and 6B are plan views of modified forms of the template shown in FIG. 1;

FIG. 7 is a perspective view illustrating the template assembly of FIG. 5 as mounted on a half hinge of a lens support;

FIG. 8 is a perspective view illustrating the template assembly of FIG. 5 in association with a drill bit;

FIG. 9 is a view, similar to FIG. 7, but illustrating a modified template assembly as arranged for forming a bore in a bevelled end of a lens support;

FIG. 10 is a plan view of the template of FIG. 9;

FIG. 11 is a perspective view of the template of FIGS. 9 and 10 having a drilling tube and two clamping stabilizers assembled therewith to form a template assembly;

FIG. 12 is a perspective view of the underside of the template of FIG. 9, illustrating a recess;

FIG. 13 is a perspective view of an assembly handle for use with the template shown in FIG. 8;

FIG. 14 illustrates a drill bit formed with stop means for limiting the depth of drilling;

FIG. 15 is a plan view illustrating two template assemblies, such as shown in FIG. 11, mounted on the half hinges at opposite ends of a lens support;

FIGS. 16 and 17 are plan views, similar to FIG. 15, illustrating the functioning of a pilot hole in the template shown in FIG. 10;

FIG. 18 is a plan view of an adjustable template in an open position;

FIG. 19 is a view similar to FIG. 18 but showing the template in its partially closed or adjusted position;

FIG. 20 is a plan view of a modified form of template as clamped onto the half hinge of a lens support;

FIG. 21 is an elevation view illustrating a further modified form of template as mounted on a lens support;

FIGS. 22 and 23 are elevation view illustrating the template assembly of FIG. 11, with an adjustable drilling tube, the drilling tube being shown in two different adjusted positions;

FIGS. 24, 25 and 26 are perspective views illustrating the half hinge location on three different forms of lens supports, and further illustrating the bore for receiving the sleeve of the adjusting assembly;

FIG. 27 is an enlarged partial perspective view of the lens support shown in FIG. 24;

FIG. 28 is a perspective view of a template assembly for use with the lens support shown in FIG. 26;

FIG. 29 is a perspective view illustrating the template assembly of FIG. 28 as mounted on the lens support shown in FIG. 26;

FIG. 30 is a perspective view of a modified form of template assembly provided with angularly adjustable clamping stabilizers;

FIG. 31 is a plan view of an adjustable clamping type template cooperable with either a half or full hinge of a spectacle frame, the template being shown in open position;

FIG. 32 is a plan view of the template shown in FIG. 31 in the partially closed and clamping position;

FIG. 33 is a plan view of two templates, as shown in FIGS. 31 and 32, assembled in clamping relation with the two full hinges of a completely assembled spectacle frame;

FIG. 34 is an elevation view further illustrating one template, such as shown in FIGS. 31 and 32, clamped onto a full hinge of an assembled spectacle frame; and FIGS. 35 through 39 are plan views, similar to FIG. 31, illustrating modified forms of the clamping template.

DESCRIPTION OF THE PREFERRED EMBODIMENTS

FIGS. 1 through 5, 7 and 8 illustrate a template assembly for use in accurately drilling a blind bore 19 (FIG. 27) in the lens support 12 of the spectacle frame 10 shown in FIG. 15. The template 55 comprises an L-shape plate or bar 54 of a strong material, such as steel, which is formed with a threaded bore 56 in one edge thereof, with a bore 57 extending completely through its wider surfaces, and with a bore 58, also extending completely through its wider surfaces, all as shown in FIG. 1. While an L-shape template plate or bar is shown in FIGS. 1, 5, 7 and 8, the bar may have another shape, as will be apparent from the description hereinafter. Thus, the bar may be T-shaped, (FIG. 9), may have one leg, either at one edge or centered, or may have two or a plurality of legs (FIGS. 6A and 6B).

FIG. 2 shows a template assembly rod or pivot 50 comprising a cylindrical shank 51 having a stud portion 52, which may be threaded, extending axially from one end thereof. The purpose of assembly rod 50 will be described hereinafter.

FIG. 3 shows a clamping stabilizer 60 which is in the form of a cylindrical rod 61 having a threaded stub 62 integral therewith and extending axially from one end. A drilling tube 65 is shown in FIG. 4 as comprising a tubular rod having an external thread 66 and formed with a smooth inner bore 67. The elements 50, 60 and 65 cooperate with the template 55 of FIG. 1 to form a template assembly. As already mentioned, the drilling tube may have a smooth outer surface and may be held in position by a set screw, or cemented or soldered in place. Also, in certain circumstances, the drilling tube may be omitted and the drill can be guided by a bore of suitable dimensions formed in the template plate or bar.

To form the template assembly, the clamping stabilizer 60 is threaded through the threaded bore 57, as shown in FIG. 5, and the drilling tube 66 is threaded through the threaded bore 58 so that its inner end 68 extends somewhat beyond the template 55 as does also the stud portion 62 of the stabilizer 60 having an inner end 64. The template assembly 55-60-65 is intended for use in properly locating and forming the blind bore 19 in an already manufactured spectacle frame 10, such as in the lens support thereof, having a half hinge 13 already riveted thereto. This makes possible the application of the adjusting assembly to either a newly manufactured or used spectacle frame 10.

Referring to FIGS. 7 and 8, the template assembly is properly positioned by being "mounted" on the hinge 13 of lens support 12. For this purpose, the template assembling tool 50 has its threaded stud end 52 inserted through the rings of hinge 13 and then threaded into the threaded bore 56 of the template 55. By the use of the stabilizer 60, the template assembly is then properly angularly adjusted for formation of the blind bore 19. After the stabilizer 60 has been used to properly orient the template 55, the drilling tube 65 is rotated to bring its inner end 68 into engagement with the inner surface of the lens support 12 of the spectacle frame 10. During this time, the stud portion of the assembly tool 50 serves as a pivot for the template 55. The template assembly is clamped in its fixed adjusted position by virtue of engagement of the respective inner ends 64 and 68 of the clamping 60 and the drilling tube 65 with the inner surface 63 of the lens support 12. The element 60 thus serves both as a stabilizer and, in conjunction with tube 64, as a clamp to provide the proper orientation of the template assembly.

With the template assembly thus properly positioned with the clamping stabilizer 60 and the drilling tube 65 engaged with the inner surface 63 of lens support 12, the blind bore 19 can be formed by a drill bit 70 (FIG. 8) guided in drilling tube 65, whose internal diameter is only slightly larger than the external diameter of drill bit 70. The drill bit 70 may be secured in the chuck 71 of a suitable drill, such as a power drill, and the drill bit 70 may be provided with a collar or the like 72 to limit the depth of the blind bore 19 by engagement with the outer end of the drilling tube 65 when bore 19 has been drilled to the proper depth. While FIG. 7 illustrates the template assembly as used with a lens support 12 having a flat outer end, it will be appreciated that, due to the angular adjustability of the template assembly, the template assembly can also be used to form a blind bore 19 in the bevelled end of a lens support 12 having such a bevelled end.

It should also be noted that the template assembly 55-50-60-65 can be used to properly form the blind bore 19 at either the right end or the left end of a lens support 12. This can be easily done by inverting the plate 54 from the position shown in FIG. 1 and then assembling the clamping stabilizer 60 and the drilling tube 65 thereto from the then upper side.

However, the necessity for this inversion can be avoided by using the dual-stabilizer and dual-hinge-shaft template 85 shown in FIGS. 9 through 12. Referring to FIGS. 9 through 12, template 85 comprises a T-shape bar 74, formed of metal or other strong material, having a leg 76 and a cross-head 77. Two threaded bores 57′ are formed through head 77 of bar 74 at equal distance from a bore 58 in leg 66, and bores 57′ each receive a respective clamping stabilizer 60. The stem 76 of plate 74 is formed with the bore 58′ which receives the drilling tube 65. Bore 58′ may be internally threaded, if it is to be used with an externally threaded drilling tube 65, or may be smooth, if it is to be used with a drilling tube 65 having a smooth outer surface. Near its outer edge, leg 76 is formed with two symmetrically located "pilot holes" 78 for a purpose to be described. The inner edge of head 77 of bar 74 is further formed with two additional bores 56′, symmetrically located with respect to bore 58′, and these bores receive respective hinge-engaging pivot shafts 80A and 80B which may be threaded or smooth, shaft 80A being a left hand pivot and shaft 80B being a right hand pivot. If these shafts are threaded, they are cooperable with an operating handle 81 having an internal thread 82 engageable with either of the threaded shafts 80A and 80B. Handle 81 may have a closed outer end. In using the template assembly comprising the template 85, the template is "mounted" on a hinge 13 or 13′ by engaging one of the pivot shafts 80A or 80B through the hinge and then screwing the handle 81 onto the shaft to tighten and clamp the template to the hinge in adjusted position.

Referring particularly to FIG. 9, the template assembly including the template 85 is illustrated as arranged for forming a blind bore 19 in the inner bevelled surface 83 of a bevelled outer end 84 of a lens support 12′ of a spectacle frame 10′, lens support 12′ having a half hinge 13′ affixed thereto just inwardly of the bevelled end 84. For this purpose, the "left hand" threaded shaft 80A is inserted through the rings of half hinge 13′ and then the assembly handle 81 is screwed thereon to clamp the template assembly relative to the hinge 13′. The clamping stabilizer 60 at the left in FIG. 9 is then rotated to adjust the template 85 to the proper angular position, after which the drilling tube 65 is threaded further in to engage the surface 83, which thereby stabilizes or clamps the entire template assembly firmly in position. The bit 70 is then inserted through the drilling tube 65 and the blind bore 19 is drilled to the proper depth which is regulated by the collar 72 on the drill bit 70.

As shown more particularly in FIG. 12, the undersurface of template 85 is formed with a recess 89 whose diameter is substantially coincident with the inner edge of the head portion 77 of the flat plate 74. The provision of the recess 89, which may or may not be semi-circular, facilitates angular adjustment of the template 85 to orient the drilling tube substantially perpendicular to surface 83 when used to form a blind bore 19 in the bevelled surface 83 of a bevelled end 84 of the lens support 12′ of spectacle frame 10′, as shown more clearly in FIG. 9.

FIG. 14 illustrates a novel drill bit for use with the invention, and which comprises a tool bit 70 with a collar 72. To receive the collar 72, the tool bit 70 is formed with an annular groove or journal 73 in which the collar 72, which is in the nature of a split ring, is snapped into position.

FIG. 15 illustrates how the "dual" template 85 is applied to both the right and the left ends of a lens support 12 for the forming of respective blind bores 19 in each end surface 63.

FIGS. 16 and 17 illustrate how the "pilot holes" 78 function in properly locating a "dual" template, such as template 85, for properly locating the blind bore 19 with respect to a half hinge. As shown in FIG. 16, the left hand "pilot hole" 78 is beyond the outer edge of the lens support 12, so that it is "open" and light can be seen therethrough. This indicates that the particular size template 85 shown in FIG. 16 is not the right size for the particular lens support 12. Conversely, in FIG. 17, the left hand "pilot hole" 78 is blocked or "dark" indicating that the template 85 used in FIG. 17 is the proper size for the particular lens support 12. Such a pilot hole 78 may be provided in the template 85, or in the other templates now to be described.

To avoid the necessity of having different size templates for different sizes of lens supports 12, a split and adjustable template 90, such as shown in FIGS. 18 and 19, may be used. The template 90 comprises a fixed rectangular plate 75A and a movable rectangular plate 75B. Fixed plate 75A is formed with a threaded bore therethrough for receiving the clamping stabilizer 60. Its edge facing movable plate 75B is formed with a first blind bore 91 in which one end of a shaft or rod 86 is fixed, and is also formed with a second blind bore 92 in which one end of a threaded shaft 87 is fixed. The narrower edge of plate 75A adjacent clamping stabilizer 60 is formed with a bore receiving a pivot shaft 80C corresponding to the similar shafts 80A and 80B.

The movable plate 75B is formed with a bore 67 therethrough, which may be threaded, to receive an externally threaded drilling tube 65, or which may be smooth, to receive a drilling tube having a smooth exterior surface. Alternatively, the bore 67 may be used as a guide for the drill bit. This plate is also formed with a bore 94 extending completely between its two longer edges and slidably receiving the pin, rod, or shaft 86. One narrower edge of plate 75B is formed with a rectangular notch or slot 93, and a bore 96 is formed between the opposite longitudinal edges of the movable plate 75B in alignment with the bore 92 and slidably receiving the threaded, but non-rotatable, shaft 87. A thumb wheel 88 is threadedly engaged with shaft 87 and received in the slot 93. Thus, by rotation of the thumb wheel 88, the plates 75A and 75B can be adjusted toward and away from each other to properly locate the drilling tube 65 with respect to the threaded pivot shaft 80C which is extended through the rings of a half hinge. As previously mentioned, the split and adjustable template 90 may be provided with a pilot hole to assure proper positioning of the drilling tube 65.

With certain types of lens frames 10″, it may not be feasible to properly locate the drilling tube 65 by mounting a template to pivot about a shaft inserted through the hinge rings of a half hinge 13″ on the inner surface 63″ of the lens support 12″, as shown in FIG. 20. For this situation, a C-clamp template 95 is provided which is in the form of a substantially square plate formed with a large rectangular notch 97. In use, this notch embraces the half hinge 13″ with one surface engaging the half hinge, and rests against the surface 63″, or the clamp 95 may be spaced slightly from the surface 63″. The clamping stabilizer 60 is engaged through a threaded aperture so that it can serve to clamp the template 95 against the half hinge 13″.

Another form of clamp-on template is shown at 100 in FIG. 21. This clamp-on template has a generally rectangular C-shape including an upper leg 101 and a lower leg 102, extending parallel to leg 101, and a bight 103 interconnecting the two legs. The upper leg 101 is formed with a notch or slot 104 arranged to receive the hinge 13. Clamping stabilizer 60 is threaded through leg 101 to engage the inner surface 63 of the lens support 12, and drilling tube 65 is threaded through leg 101 to engage the inner surface 63 by its inner end 68. Leg 103 engages the outer surface of the lens support 12. By virtue of the clamping stabilizer 60 and the drilling tube 65, the clamp 100 is firmly clamped in operative relation to lens support 12 and half hinge 13.

As previously mentioned, the template or jig for incorporating the adjustment mechanism into already manufactured spectacle frames, each comprising a frontal lens support and a pair of temples, with the frontal lens support having two half hinges each adjacent one of its outer ends and each temple having a half hinge adjacent its inner end, may be used with either the frontal lens support or one of the temples before the temples are assembled to the lens support, as by interconnection of the mating half hinges, or with a full hinge formed by assembling the two temples to the frontal lens support by inserting hinge pins through the mating half hinges. A template assembly, usable with either a half hinge or with a full hinge, is illustrated in FIGS. 31 through 34, wherein it will be noted that the template assembly 120 is somewhat similar to the template assembly 90 of FIGS. 18 and 19.

Referring more specifically to FIGS. 31 through 34, template assembly 120 comprises a pair of relatively movable plates 125A and 125B. For convenience, plate 125A will be referred to as a "fixed" plate and plate 125B will be referred to as a "movable" plate. The template assembly 120 further includes a clamping stabilizer 60′, a guide rod 86′ and a threaded adjusting rod 130. The stabilizer 60′ has an operating handle 61′, a shaft 62′ extending coaxially from handle 61′ and a threaded end 64′ on the inner end of shaft 62′. The stabilizer is insertable through a bore 121 in "movable" plate 125B and threaded end 64′ is engageable in a threaded bore 122 in "fixed" plate 125A. These two bores extend between the longer edges of the relatively movable plates.

The guide rod 86′ has one end fixedly secured in a bore 91′ in "fixed" plate 125A and its other end slidably engaged in a bore 94′ in "movable" plate 125B. Bore 91′ is a blind bore, whereas bore 94 extends between the two longer edges of "movable" plate 125B.

The stem 87′ of adjusting rod 130 is threaded, and one end thereof is secured in a blind bore 92′ in "fixed" plate 125A. The threaded adjusting rod stem 87′ extends through a smooth bore 96′, in "movable" plate 125B, which opens into a C-shape slot formed in plate 125B and opening outwardly of the outer longer edge of plate 125B. The threaded stem 87′ is engaged by the handle portion 131 of adjusting rod 130, which is formed with an axial threaded bore 132, a reduced neck portion 133 and a head 134. The threaded bore 132 extends through neck portion 133 and head portion 134, and the outer or right hand end of threaded shaft 87′ is threaded into the threaded bore 132. Head 134 is engaged in the notch or slot 93′.

Plate 125B is formed with a further bore 67′ extending completely between its wider surfaces and arranged to receive the drilling tube 65. Depending upon whether the drilling tube 65 is externally threaded or has a smooth outer surface, bore 67′ may be internally threaded or may have a smooth inner surface. Alternatively, drilling tube 65 may be omitted and bore 67′ may be used as a guide for a drill.

The arrangement shown in FIGS. 31 through 34 is applied in a manner which will now be described. The template 120 is arranged so that the plates 125A and 125B are on respective opposite sides of either a half hinge 13, on a lens support 12, or a half hinge 13, on a temple 11, or on opposite sides of a full hinge 13A of an assembled spectacle frame, as particularly shown in FIGS. 33 and 34. Adjusting rod 130 is then threaded onto threaded shaft 87 to clamp the plates 125A and 125B in engagement with either the half hinge 13 or the full hinge 13A, the plates, during this operation, being guided by the guide rod 86. Clamping stabilizer 60′ is then operated to engage its threaded inner end 64′ in threaded bore 122 in plate 125A, and is turned until the inner end of handle 161′ applies firmly against the outer longer edge of plate 125B. At this time, drilling tube 65 firmly engages the hinge end of temple 11 and has pivoted temple 11 so that the temple outer end bears firmly against lens support 12, as shown in FIG. 34. The template assembly is then in proper position for forming the blind bore in, for example, lens support 12, as by guiding of a drill bit through the drilling tube 65 or through the bore 67′.

FIGS. 31 and 32 illustrate the template assembly 120 as applied to a half hinge 13, while FIGS. 33 and 34 illustrate template assemblies 120 as applied to either one full hinge 13A or to both full hinges 13A.

FIGS. 35 through 39 illustrate alternative embodiments of the template assembly 120. Referring briefly to these figures, in the template assembly 120A of FIG. 35, stabilizer 60' and guide rod 86' have been omitted. In the template assembly 120B of FIG. 36, only stabilizer 60' has been omitted. In the template assembly 120C, of FIG. 37, guide rod 86' has been omitted. In the template assembly 120D of FIG. 38, adjusting rod 130 and guide rod 86' have been omitted. In the template assembly 120E of FIG. 39, only adjusting rod 130 has been omitted.

For the purpose of limiting the position of drilling tube 65 relative to a template, such as template 85, the drilling tube 65 may be provided with a lock nut 98 as shown in FIGS. 22 and 23, which illustrate respectively different positions of the drilling tube 65.

FIGS. 24, 25 and 26 show the three different types of lens supports in common use. FIG. 24 shows a lens support 12 having a flat inner surface 63 in which the blind bore 19 is formed. FIG. 35 shows a lens support 12' having a bevelled end 84 with a bevelled surface 83 in which the blind bore 19 is formed. FIG. 26 shows a lens frame 10''' including a lens support 12''' of the "contour" type having a curved outer end 201 with a flat terminal surface 202 in which the blind bore 19 is formed.

FIG. 27 illustrates the bore 19 as formed with a countersunk bevelled outer edge 19' facilitating a full insertion of flange 23 of the adjusting assembly into the bore 19.

For use in forming a bore 19 in the flat terminal end 202 of the bent end 201 of the "contour" type spectacle frame 10''', a template 105, such as shown in FIGS. 28 and 29, is provided. This template comprises a flat plate portion 103 and a flat plate portion 104 interconnected integrally by a curved neck 106. The plate portions 103 and 104 are substantially rectangular, but may have a different shape, and are oriented at substantially right angles to each other. Rectangular plate portion 103 is formed with an aperture receiving the drilling tube 65, and rectangular plate portion 104 is formed with a threaded bore receiving the clamping stabilizer 60. Neck portion 106 is formed with a threaded bore extending transversely therethrough to receive a fixedly secured threaded pivot shaft 80D. Rectangular plate portion 103 may also be formed with the "pilot holes" 78.

As shown in FIG. 29, template 105 is "mounted" on hinge 13 by extending pivot shaft 80D through the hinge rings and locking it in position by use of the internally threaded handle member 81. Clamping stabilizer 60 is then operated to adjust template 105 about the axis of shaft 80D so that plate portion 103 extends parallel to the terminal surface 102 of bent end 101. The drilling tube 65 is then threaded inwardly until its inner end 68 bears firmly against the surface 102. Thereafter, the bit 70 may be inserted through the drilling tube 65 to drill the blind bore 19 in the end surface 102.

FIG. 30 shows a template 110 which is a modified version of the template 85 to provide for pivotal adjustment of the clamping stabilizers 60. The template 110 comprises a T-shaped flat bar or plate 111 formed with a leg 112 and a cross-head 113, and the undersurface of flat plate 111 may be formed with a semi-circular recess 114, identical to the recess 89 of the template 85 as shown in FIG. 11. Stem 112 is formed with a threaded bore for receiving the drilling tube 65 having the bore 67, and is also formed with the "pilot holes" 78. The inner edge of head 113 is formed with bores receiving the pivot shafts 80A and 80B. So far, the construction is substantially identical to that of template 85 of FIGS. 9, 10 and 11.

In addition, the inner edge 116 is formed with a pair of symmetrically located recesses outwardly of the recesses receiving the shafts 80A and 80B, and each of these additional recesses receives the inner end of a respective pivoting post 115. The smooth surface outer portion of each post 115 is formed with a diametrically extending threaded bore therethrough for receiving the threaded stem or stub portion 62 of a respective clamping stabilizer 60. Preferably, the inner ends of stems or studs 62 are pointed, as indicated at 64'.

The objective of the template 110 shown in FIG. 30 is to provide a template assembly in which the clamping stabilizers can be readily pivoted to the most stable position when the stabilizers are to be tightened. The most stable position is when the stabilizer stud 62 is perpendicular to the temple, the lens support, or the like being drilled. Inasmuch as the template is seldom perpendicular to the lens support or the like during use, the pivotable clamping stabilizer 60 may be independently adjusted both axially and angularly as required for stability. The points 64', which are preferred, may be used to effect sure engagement. The template 110 is otherwise used in the same manner as is the template 85, previously described.

While specific embodiments of the invention have been shown and described in detail to illustrate the application of the principles of the invention, it will be understood that the invention may be embodied otherwise without departing from such principles.

What is claimed is:

1. A template assembly, for use in forming a bore in one of the lens support and the temple of a spectacle frame of the type including a frontal lens support, incorporating a nose bridge, a pair of temples, and respective hinges connecting each temple to a respective outer end of the lens support, for the bore to receive a temple adjusting assembly including an internally threaded element and an externally threaded adjusting member engaged in each element and having an outer end engaging the other of the lens support and the temple at a point spaced outwardly from the axis of the associated hinge, said template assembly comprising, in combination, plate means including means for guiding a drill bit for forming the bore; stabilizer means operatively associated with said plate means; and means operatively associated with said plate means for operatively engaging said template assembly selectively with either a half hinge on one of said lens support and said temple or with a full hinge connecting a lens support to a temple; said clamping stabilizer means being adjustable to clamp said plate means relative to the surface in which said bore is to be formed, when said template assembly is engaged with either a half hinge or a full hinge, to control and fixedly stabilize the angular relationship between said template assembly and the surface in which said bore is to be formed.

2. The improvement claimed in claim 1, in which said plate means includes a flat plate portion; said drill bit guiding means including a bore extending through said flat plate portion between the wider surfaces thereof.

3. The improvement claimed in claim 2, in which said drill bit guiding means comprises a drilling tube engaged in said bore extending between the wider surfaces of said flat plate portion.

4. The improvement claimed in claim 3, in which said drilling tube is fixed against adjustment in said last-mentioned bore.

5. The improvement claimed in claim 3, in which said bore extending between the wider surfaces of said flat plate portion is internally threaded; said drilling tube being externally threaded for threaded engagement through said internally threaded bore.

6. The improvement claimed in claim 5, including a nut threaded on said drilling tube and fixing said drilling tube in its adjusted position.

7. The improvement claimed in claim 3, in which said bore extending between the wider surfaces of said flat plate portion is a smooth bore; said drilling tube having a smooth external surface conforming to the smooth internal surface of said bore.

8. The improvement claimed in claim 3, including means adjustably positioning said drilling tube in said bore extending between the wider surfaces of said flat plate portion.

9. The improvement claimed in claim 1, in which said plate means includes a flat plate portion having a threaded bore extending between a pair of opposite surfaces thereof; said clamping stabilizer means including a threaded stud threadedly engaged through said threaded bore.

10. The improvement claimed in claim 9, including a handle secured to one end of said threaded stud.

11. The improvement claimed in claim 1, in which said plate means includes a flat plate portion constituted by a substantially rectangular head and at least one leg projecting from an edge of said head.

12. The improvement claimed in claim 11, including plural legs projecting from said one edge of said rectangular head.

13. The improvement claimed in claim 1, in which said plate means comprises two coplanar flat plate portions having facing parallel edges; said means for operatively engaging said template assembly selectively with either a half hinge or a full hinge comprising threaded adjusting means interconnecting said flat plate portions and operable to adjust said flat plate portions toward and away from each other in a direction perpendicular to said parallel edge surfaces to operatively engage either a half hinge or a full hinge between said parallel edge surfaces.

14. The improvement claimed in claim 1, including abutment means on said drill bit engageable with said guiding means to limit the depth of drilling of said blind bore.

15. A template assembly, for use in forming a bore in one of the lens support and the temple of a spectacle frame of the type including a frontal lens support, incorporating a nose bridge, a pair of temples, and respective hinges connecting each temple to a respective outer end of the lens support, for the bore to receive a temple adjusting assembly including an internally threaded element and an externally threaded adjusting member engaged in each element and having an outer end engaging the other of the lens support and the temple at a point spaced outwardly from the axis of the associated hinge, said template assembly comprising, in combination, plate means including means for guiding a drill bit for forming the bore; clamping stabilizer means operatively associated with said plate means; and means operatively associated with said plate means for operatively engaging said template assembly selectively with either a half hinge on one of said lens support and said temple or with a full hinge connecting a lens support to a temple; said clamping stabilizer means being adjustable to clamp said plate means relative to the surface in which said bore is to be formed, when said template assembly is engaged with either a half hinge or a full hinge, to control and fixedly stabilize the angular relationship between said template assembly and the surface in which said bore is to be formed, said plate means including a flat plate portion having at least one bore formed in an edge surface thereof; said means for operatively engaging said template assembly with either a half hinge or a full hinge including a respective template assembly tool engaged in each said last-mentioned bore and extendable through the rings of a half hinge for mounting said template assembly on a half hinge.

16. The improvement claimed in claim 15, in which said plate portion is an L-shaped plate having a bore formed in one leg of the ell and extending between the wider surfaces of the plate; said guiding means comprising a drilling tube engaged in said last-mentioned bore; each assembly tool receiving bore being formed in an edge of the other leg of the ell and being internally threaded; said template assembly tool comprising an externally threaded stem having an operating handle secured to one end thereof whereby, after extension of said stem through the rings of the half hinge and threaded engagement of said stem into the associated internally threaded tool receiving bore, said handle may be operated to operatively engage the rings of the half hinge between said L-shaped plate and the handle of said template assembly tool.

17. The improvement claimed in claim 15, in which said plate portion is a T-shaped plate including a leg and a cross-head; an internally threaded bore formed in the leg of said T-shaped plate between the wider surfaces of said plate; said guiding means comprising an externally threaded drilling tube engaged in said last-mentioned bore; said clamping stabilizer means comprising an externally threaded stud; said T-shaped plate being formed with two internally threaded stabilizer-receiving bores, each adjacent a respective end of said cross-head; respective said clamping stabilizers engaged in each of said stabilizer receiving bores; said T-shaped metal plate being formed with two internally threaded assembly tool receiving bores in the inner edge of said cross-head symmetrically adjacent said leg; respective template assembly tools threaded into each of said assembly tool receiving bores; said template assembly being usable with either the left hand half hinge or the right hand half hinge on said frontal lens support by engagement of the respective template assembly tool through the rings of the respective half hinge and with a respective one of said clamping stabilizers being engaged with the inner surface of said frontal lens support; and an internally threaded handle selectively engageable with either of said template assembly tools to operatively engage said T-shaped flat plate with the associated half hinge.

18. The improvement claimed in claim 17, in which the undersurface of said cross-head is formed with a recess facilitating use of said template assembly with a frontal lens support having bevelled outer end edges.

19. The improvement claimed in claim 17, in which said leg is formed with a pair of pilot holes therein adjacent its outer edge and symmetrically located with respect to said drilling tube receiving bore; whereby, when said template assembly is mounted on a half hinge, the blocking or clearing of a pilot hole will indicate whether or not said drilling tube is properly located fro forming of said blind bore in said lens support.

20. A template assembly, for use in forming a bore in one of the lens support and the temple of a spectacle frame of the type including a frontal lens support, incorporating a nose bridge, a pair of temples, and respective hinges connecting each temple to a respective outer end of the lens support, for the bore to receive a temple adjusting assembly including an internally threaded element and an externally threaded adjusting member engaged in each element and having an outer end engaging the other of the lens support and the temple at a point spaced outwardly from the axis of the associated hinge, said template assembly comprising, in combination, plate means including means for guiding a drill bit for forming the bore; clamping stabilizer means operatively associated with said plate means; and means operatively associated with said plate means for operatively engaging said template assembly selectively with either a half hinge on one of said lens support and said temple or with a full hinge connecting a lens support to a temple; said clamping stabilizer means being adjustable to clamp said plate means relative to the surface in which said bore is to be formed, when said template assembly is engaged with either a half hinge or a full hinge, to control and fixedly stabilize the angular relationship between said template assembly and the surface in which said bore is to be formed, said plate means comprising a fixed flat plate portion and a movable flat plate portion, which are substantially coplanar; a smooth guide pin secured in said fixed plate portion and extending from that edge thereof facing an edge of said movable plate portion and through a passage formed in said movable plate portion for movement of said plate portions toward and away from each other; a threaded shaft secured in said fixed plate portion to extend from said edge thereof through a passage in said movable plate portion; said movable plate portion being formed with a slot intersecting said last-named passage therethrough; a rotatable nut positioned in said slot and engageable with said last-mentioned threaded shaft for adjustment of said movable plate portion relative to said fixed plate portion; said clamping stabilizer means comprising an externally threaded stud; said fixed plate portion being formed with an internally threaded stabilizer receiving bore extending between its wider surfaces; said guiding means comprising a drilling tube; said movable plate portion being formed with a drilling tube receiving bore extending between its wider surfaces; said means for operatively engaging said template assembly with either a half hinge or a full hinge comprising a template assembly tool extending from another edge of said fixed plate portion adjacent said stabilizer receiving bore and engageable in the rings of a half hinge; whereby, by rotation of said nut, the distance between said fixed and movable plate portions may be adjusted.

21. A template assembly, for use in forming a bore in one of the lens support and the temple of a spectacle frame of the type including a frontal lens support, incorporating a nose bridge, a pair of temples, and respective hinges connecting each temple to a respective outer end of the lens support, for the bore to receive a temple adjusting assembly including an internally threaded element and an externally threaded adjusting member engaged in each element and having an outer end engaging the other of the lens support and the temple at a point spaced outwardly from the axis of the associated hinge, said template assembly comprising, in combination, plate means including means for guiding a drill bit for forming the bore; clamping stabilizer means operatively associated with said plate means; and means operatively associated with said plate means for operatively engaging said template assembly selectively with either a half hinge on one of said lens support and said temple or with a full hinge connecting a lens support to a temple; said clamping stabilizer means being adjustable to clamp said plate means relative to the surface in which said bore is to be formed, when said template assembly is engaged with either a half hinge or a full hinge, to control and fixedly stabilize the angular relationship between said template assembly and the surface in which said bore is to be formed, said plate means comprising a substantially rectangular flat plate formed with a substantially rectangular slot of a width sufficient to embrace a half hinge engaging one side of said slot; said means for operatively engaging said template assembly with a half hinge or a full hinge comprising a template assembly tool including a threaded stem engageable through a threaded bore opening through the other side of said slot and having an operating handle on the outer end thereof, said threaded stub being engageable with the half hinge to operatively engage said template assembly with the half hinge.

22. A template assembly, for use in forming a bore in one of the lens support and the temple of a spectacle frame of the type including a frontal lens support, incorporating a nose bridge, a pair of temples, and respective hinges connecting each temple to a respective outer end of the lens support, for the bore to receive a temple adjusting assembly including an internally threaded element and an externally threaded adjusting member engaged in each element and having an outer end engaging the other of the lens support and the temple at a point spaced outwardly from the axis of the associated hinge, said template assembly comprising, in combination, plate means including means for guiding a drill bit for forming the bore; clamping stabilizer means operatively associated with said plate means; and means operatively associated with said plate means for operatively engaging said template assembly selectively with either a half hinge on one of said lens support and said temple or with a full hinge connecting a lens support to a temple; said clamping stabilizer means being adjustable to clamp said plate means relative to the surface in which said bore is to be formed, when said template assembly is engaged with either a half hinge or a full hinge, to control and fixedly stabilize the angular relationship between said template assembly and the surface in which said bore is to be formed, said plate means comprising a rectangular C-shaped plate having first and second substantially parallel legs interconnected by a bight perpendicular to said legs; said clamping stabilizer means comprising an externally threaded stud; said guiding means comprising a drilling tube; an internally threaded stabilizer receiving bore and a drilling tube receiving bore being formed in said first leg; said second leg being engageable with the outer surface of a frontal lens support and said first leg being formed with a substantially rectangular slot for receiving a half hinge; said template assembly being secured in adjusted position on said frontal lens support by engagement of said clamping stabilizer and said drilling tube with the inner surface of said frontal lens support to clamp said template assembly to said frontal lens support.

23. A template assembly, for use in forming a bore in one of the lens support and the temple of a spectacle frame of the type including a frontal lens support, incorporating a nose bridge, a pair of temples, and respective hinges connecting each temple to a respective outer end of the lens support, for the bore to receive a temple adjusting assembly including an internally threaded element and an externally threaded adjusting member engaged in each element and having an outer end engaging the other of the lens support and the temple at a point spaced outwardly from the axis of the associated hinge, said template assembly comprising, in combination, plate means including means for guiding a drill bit for forming the bore; clamping stabilizer means operatively associated with said plate means; and means operatively associated with said plate means for operatively engaging said template assembly selectively with either a half hinge on one of said lens support and said temple or with a full hinge connecting a lens support to a temple; said clamping stabilizer means being adjustable to clamp said plate means relative to the surface in which said bore is to be formed, when said template assembly is engaged with either a half hinge or a full hinge, to control and fixedly stabilize the angular relationship between said template assembly and the surface in which said bore is to be formed, said plate means comprising first and second flat plate portions extending perpendicularly to each other and interconnected integrally by an intermediate portion; said clamping stabilizer means comprising an externally threaded stud; said guiding means comprising a drilling tube; said first plate portion being formed with a drilling tube receiving bore on said second plate portion being formed with an internally threaded stabilizer receiving bore; said intermediate portion being formed with an internally threaded bore between opposite edges thereof; said means for operatively engaging said template assembly with a half hinge or a full hinge comprising an externally threaded stud threaded through said last-mentioned internally threaded bore and engageable in the rings of a half hinge, said stud receiving an internally threaded handle operable to operatively engage said template assembly to the half hinge; said template assembly being arranged to guide the drilling of a blind bore in the end surface of a bent end of curved frontal lens support.

24. A template assembly, for use in forming a bore in one of the lens support and the temple of a spectacle frame of the type including a frontal lens support, incorporating a nose bridge, a pair of temples, and respective hinges connecting each temple to a respective outer end of the lens support, for the bore to receive a temple adjusting assembly including an internally threaded element and an externally threaded adjusting member engaged in each element and having an outer end engaging the other of the lens support and the temple at a point spaced outwardly from the axis of the associated hinge, said template assembly comprising, in combination, plate means including means for guiding a drill bit for forming the bore; clamping stabilizer means operatively associated with said plate means; and means operatively associated with said plate means for operatively engaging said template assembly selectively with either a half hinge on one of said lens support and said temple or with a full hinge connecting a lens support to a temple; said clamping stabilizer means being adjustable to clamp said plate means relative to the surface in which said bore is to be formed, when said template assembly is engaged with either a half hinge or a full hinge, to control and fixedly stabilize the angular relationship between said template assembly and the surface in which said bore is to be formed, said plate means comprising a T-shaped plate including a leg and a cross-head; said guiding means comprising a drilling tube; said stem being formed with a drilling tube receiving bore; the inner edge of said cross-head being formed with a pair of symmetrically located stabilizer receiving bores each adjacent an outer end of said inner edges; respective externally threaded pins engageable in each of said stabilizer receiving threaded bores and each formed with a diametrically extending internally threaded bore therethrough; said clamping stabilizer means comprising respective externally threaded studs engaged in each of said diametrically extending bores, whereby said studs can be adjusted both angularly and axially.

25. A template device for facilitating the drilling of a bore by a drill disposed at a selective angle and position relative to an end piece of an eyeglass frame having a temple piece and a hinge thereon oriented relative to said end piece, comprising a plate having a plate bore therethrough with a plate bore axis oriented at a selected axis angle in respect to said plate, a tube having a drill receiving bore therethrough disposed in the plate bore with an end for the exit of the drill which is adapted to extend outwardly from the plate into engagement with the frame, adjustment means for adjusting said tube in the plate bore so as to position it so that the end is engageable against the frame, and clamping means associated with said plate for clamping said plate to said frame to position said plate relative to said hinge.

26. A template device according to claim 25, wherein said plate has substantially flat top and bottom surfaces, said plate bore having an axis oriented at an angle in respect to the axis of said plate.

27. A template device according to claim 25, wherein said plate has an edge with a threaded bore defined therein, said clamping means including an assembly rod engaged with said hinge and threaded into said plate and pivotally supporting said plate on said hinge.

28. A template device according to claim 27, wherein said clamping means also includes a stabilizing clamp, said plate having a stabilizing clamp threaded bore defined therethrough at a spaced location from said plate bore, said stabilizing clamp being threaded into said threaded bore and being engageable with the frame, said tube being disposed on the opposite side of said assembly rod from said stabilizing clamp.

29. A template device according to claim 25, wherein said clamping means comprises a slot in said plate engageable around said hinge.

30. A template device for facilitating the drilling of a bore especially into irregular surfaces of an eyeglass frame by a flexible drill disposed at a selective angle and position relative to a hinge such as in an end piece portion of the eyeglass frame which has a template piece and a hinge thereon oriented relative to the template piece, comprising first and second coplanar plates, a stabilizing clamping bolt interconnecting said plates and being adjustable relative to said plates to cause said plates to clampingly capture therebetween the hinge of said eyeglass frame, said first plate having at least one threaded bore extending therethrough, and at least one externally threaded drilling tube threaded into said threaded plate bore for axial adjustability of said tube in said bore, said drilling tube having a drill accommodating bore therethrough for the passage of the drill, said axially adjustable threaded drilling tube being threadably adjustable to effect contact of said drilling tube with the frame and thereby providing a controlling guide for the drill through the tube up to the surface being drilled and providing a guide against deflection of the drill when said drill bears into the surface being drilled.

31. A template according to claim 30, wherein said stabilizing clamping bolt supports said plate on said hinge for pivotal movement, said drilling tube being adjustable to bear against the surface being drilled and to cause pivoting of said first plate.

32. A template device according to claim 31, wherein said stabilizing clamping bolt includes a first bolt threadably connected to at least one of said plates and at least one additional member threaded through said first plate and adapted to bear against the surface to be drilled for holding said plate in a fixed orientation relative to the surface being drilled.

33. A template device for facilitating the drilling of a bore into a surface of a frame of an eyeglass which includes a hinge projecting therefrom, comprising a clamp member engageable with the hinge on said eyeglass frame and having first and second plate portions engageable with said hinge, at least one hollow drill tube extending through said first plate portion, adjustment means for adjusting said drill tube relative to said first plate portion to permit it to move to a position in which it bears against the frame to be drilled, said drill tube having a bore therethrough for the passage of a drill so that the drill is guided right up to the frame surface at which it is to be drilled, and a stabilizer threaded into said first plate portion and being adjustably threaded to bear against said second plate portion for positioning said first and second plates relative to the hinge and for clamping it in an adjusted position.

* * * * *